(12) United States Patent
Ramachandran et al.

(10) Patent No.: US 9,714,955 B2
(45) Date of Patent: Jul. 25, 2017

(54) METHOD FOR ALIGNING A MOBILE DEVICE SURFACE WITH THE COORDINATE SYSTEM OF A SENSOR

(71) Applicant: QUALCOMM Incorporated, San Diego, CA (US)

(72) Inventors: Mahesh Ramachandran, San Diego, CA (US); Arvind Ramanandan, San Diego, CA (US); Christopher Brunner, San Diego, CA (US); Murali Ramaswamy Chari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 861 days.

(21) Appl. No.: 13/767,838

(22) Filed: Feb. 14, 2013

(65) Prior Publication Data
US 2014/0129170 A1    May 8, 2014

Related U.S. Application Data

(60) Provisional application No. 61/722,084, filed on Nov. 2, 2012.

(51) Int. Cl.
*G01P 21/00* (2006.01)
*G01C 25/00* (2006.01)

(52) U.S. Cl.
CPC .............. *G01P 21/00* (2013.01); *G01C 25/00* (2013.01); *G01C 25/005* (2013.01)

(58) Field of Classification Search
CPC ........ G01C 19/00; G01C 25/00; G01C 17/38; G01P 15/18; G01P 15/0891; G01P 21/00
(Continued)

(56) References Cited

U.S. PATENT DOCUMENTS 5,922,951 A   7/1999   O'Keefe et al.
6,073,077 A   6/2000   Hsu
(Continued)

FOREIGN PATENT DOCUMENTS

CN    101514899 A    8/2009
DE    102010001019 A1    7/2011
(Continued)

OTHER PUBLICATIONS

Partial International Search Report—PCT/US2013/066169—ISA/EPO—Jan. 24, 2014.

*Primary Examiner* — Tung Lau
(74) *Attorney, Agent, or Firm* — Kilpatrick Townsend & Stockton (57) ABSTRACT

An accelerometer in a mobile device is calibrated by taking multiple measurements of acceleration vectors when the mobile device is held stationary at different orientations with respect to a plane normal. A circle is calculated that fits respective tips of measured acceleration vectors in the accelerometer coordinate system. The radius of the circle and the lengths of the measured acceleration vectors are used to calculate a rotation angle for aligning the accelerometer coordinate system with the mobile device surface. A gyroscope in the mobile device is calibrated by taking multiple measurements of a rotation axis when the mobile device is rotated at different rates with respect to the rotation axis. A line is calculated that fits the measurements. The angle between the line and an axis of the gyroscope coordinate system is used to align the gyroscope coordinate system with the mobile device surface.

15 Claims, 5 Drawing Sheets

(58) Field of Classification Search
USPC .................................................... 702/93, 141
See application file for complete search history.

(56) References Cited

U.S. PATENT DOCUMENTS

| | | | |
|---|---|---|---|
| 6,249,745 B1 | 6/2001 | Hsu et al. | |
| 8,583,392 B2* | 11/2013 | Panagas | G01C 21/16 702/104 |
| 2011/0077891 A1* | 3/2011 | Koenig | G01P 21/00 702/104 |
| 2011/0196636 A1 | 8/2011 | Edwards | |
| 2011/0264393 A1 | 10/2011 | An et al. | |
| 2012/0022823 A1 | 1/2012 | Bennini | |
| 2012/0078562 A1 | 3/2012 | Yamada et al. | |
| 2012/0116716 A1 | 5/2012 | Lokshin et al. | |
| 2012/0130667 A1* | 5/2012 | Fukushima | G01C 25/00 702/96 |
| 2012/0166082 A1 | 6/2012 | Fortier | |
| 2012/0203486 A1 | 8/2012 | Almalki et al. | |
| 2012/0203487 A1* | 8/2012 | Johnson | G01P 21/00 702/104 |

FOREIGN PATENT DOCUMENTS

| | | | |
|---|---|---|---|
| EP | 2234003 A2 | 9/2010 | |
| JP | 2009133695 A | 6/2009 | |
| JP | 2012506548 A | 3/2012 | |
| JP | 5038240 B2 | 10/2012 | |
| JP | 5346910 B2 | 11/2013 | |
| JP | 5577990 B2 | 8/2014 | |
| WO | 2008068542 A1 | 6/2008 | |

* cited by examiner

METHOD FOR ALIGNING A MOBILE DEVICE SURFACE WITH THE COORDINATE SYSTEM OF A SENSOR

CROSS REFERENCE TO RELATED APPLICATIONS

This application claims the benefit of U.S. Provisional Patent Application No. 61/722,084, filed Nov. 2, 2012, and titled "A Method for Aligning a Mobile Device Surface with the Coordinate System of a Sensor," the disclosure of which is hereby incorporated herein by reference in its entirety and for all purposes.

BACKGROUND

Technical Field

The subject matter disclosed herein relates generally to the calibration of a sensor, such as an accelerometer and/or a gyroscope.

Related Background

An accelerometer (also referred to as a motion sensor) measures proper acceleration, which is the acceleration it experiences relative to a freefall (or the inertia). Proper acceleration is associated with the phenomenon of weight experienced by a proof mass that resides in a frame of reference of the accelerometer. An accelerometer measures the weight per unit of the proof mass, a quantity also known as specific force, or g-force. Conceptually, an accelerometer behaves as a damped mass on a spring. When the accelerometer experiences acceleration, the position of the proof mass is displaced with respect to the frame. The displacement is measured to determine the acceleration.

A gyroscope (also referred to as a rotation sensor) measures the angular velocity of a system in the inertial reference frame. By using the original orientation of the system in the inertial reference frame as the initial condition and integrating the angular velocity, the system's current orientation can be known. Conceptually, a gyroscope is a spinning rotor which maintains its orientation based on the principle of conservation of angular momentum. This phenomenon can be used for measuring and maintaining orientation in many applications, such as compasses and stabilizers in aircraft and spacecraft.

Accelerometers and gyroscopes have been incorporated into a variety of consumer electronics. The integration of accelerometers and gyroscopes allows for more accurate and robust augmented reality (AR) applications, simultaneous localization and mapping (SLAM) applications, computer vision applications, navigation applications, stability control applications, and a wide range of other applications.

SUMMARY

A method for calibrating an accelerometer located within a mobile device is described. In one embodiment, a processor of the mobile device receives a plurality of measurements of acceleration vectors from the accelerometer. Each of the measurements is taken when the mobile device is held stationary at a different orientation with respect to a normal of a plane on which the mobile device lies. The processor calculates a circle that fits respective tips of measured acceleration vectors in an accelerometer coordinate system. Based on a radius of the circle and a length of the measured acceleration vectors, the processor calculates a rotation angle between the accelerometer coordinate system with respect to a surface of the mobile device to align the accelerometer coordinate system with the mobile device surface.

In another embodiment, a mobile device comprises: an accelerometer, a processor coupled to the accelerometer, and a memory coupled to the processor. The processor is configured to: receive a plurality of measurements of acceleration from the accelerometer, each of the measurements being taken when the mobile device is held stationary at a different orientation with respect to a normal of a plane on which the mobile device lies. The processor is further configured to calculate a circle that fits respective tips of measured acceleration vectors in an accelerometer coordinate system, and calculate an angle of rotation between the accelerometer coordinate system and a surface of the mobile device based on a radius of the circle and a length of the measured acceleration vectors to align the accelerometer coordinate system with the surface of the mobile device. The angle of rotation is then stored in the memory.

In another embodiment, a computer program product is implemented at a mobile device for calibrating an accelerometer located within the mobile device. The computer program product comprises a computer-readable medium, which comprises code for: receiving a plurality of measurements of acceleration vectors by a processor of the mobile device from the accelerometer, each of the measurements being taken when the mobile device is held stationary at a different orientation with respect to a normal of a plane on which the mobile device lies; calculating a circle that fits respective tips of measured acceleration vectors in an accelerometer coordinate system; and calculating an angle of rotation between the accelerometer coordinate system and a surface of the mobile device based on a radius of the circle and a length of the measured acceleration vectors to align the accelerometer coordinate system with the surface of the mobile device.

In yet another embodiment, a mobile device comprises: means for receiving a plurality of measurements of acceleration from the accelerometer, each of the measurements being taken when the mobile device is held stationary at a different orientation with respect to a normal of a plane on which the mobile device lies; means for calculating a circle that fits respective tips of measured acceleration vectors in an accelerometer coordinate system; and means for calculating an angle of rotation between the accelerometer coordinate system and a surface of the mobile device based on a radius of the circle and a length of the measured acceleration vectors to align the accelerometer coordinate system with the surface of the mobile device.

A method for calibrating a gyroscope located within a mobile device is described. In one embodiment, a processor of the mobile device receives a plurality of measurements of a rotation axis from the gyroscope. The measurements are taken when the mobile device is being rotated at different rates with respect to the rotation axis, where the rotation axis is a normal of a plane on which the mobile device lies. The processor calculates a line that fits the measurements in a gyroscope coordinate system. The processor further calculates a rotation angle between the line and an axis of the gyroscope coordinate system to align the gyroscope coordinate system with a surface of the mobile device.

In another embodiment, a mobile device comprises: a gyroscope, a processor coupled to the gyroscope, and a memory coupled to the processor. The processor is configured to receive a plurality of measurements of a rotation axis by a processor of the mobile device from the gyroscope, the measurements being taken when the mobile device is being rotated at different rates with respect to the rotation axis, the rotation axis being a normal of a plane on which the mobile device lies; calculate a line that fits the measurements in a gyroscope coordinate system; and calculate an angle of rotation between the line and an axis of the gyroscope coordinate system to align the gyroscope coordinate system with a surface of the mobile device. The angle of rotation is then stored in the memory.

In another embodiment, a computer program product is implemented at a mobile device for calibrating a gyroscope located within the mobile device. The computer program product comprises a computer-readable medium, which comprises code for: receiving a plurality of measurements of a rotation axis by a processor of the mobile device from the gyroscope, the measurements being taken when the mobile device is being rotated at different rates with respect to the rotation axis, the rotation axis being a normal of a plane on which the mobile device lies; calculating a line that fits the measurements in a gyroscope coordinate system; and calculating an angle of rotation between the line and an axis of the gyroscope coordinate system to align the gyroscope coordinate system with a surface of the mobile device.

In yet another embodiment, a mobile device comprises: means for receiving a plurality of measurements of a rotation axis by a processor of the mobile device from the gyroscope, the measurements being taken when the mobile device is being rotated at different rates with respect to the rotation axis, the rotation axis being a normal of a plane on which the mobile device lies; means for calculating a line that fits the measurements in a gyroscope coordinate system; and means for calculating an angle of rotation between the line and an axis of the gyroscope coordinate system to align the gyroscope coordinate system with a surface of the mobile device.

DETAILED DESCRIPTION

The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

Embodiments of the invention provide calibration techniques for aligning the coordinate system of a sensor with the surface of a mobile device. The sensor is located within the mobile device and provides sensor data to the processor of the mobile device in various AR, navigation, and stability control applications. The term "sensor" herein refers to an accelerometer or a gyroscope. Typically, the sensor is factory-calibrated such that the coordinate system of the sensor aligns with the surface of the mobile device. However, factory calibration adds cost to the mobile device. The calibration techniques described herein can be performed by the processor of the mobile device when a user places the mobile device in multiple different orientations on a plane, or rotates the mobile device at different rates on a plane. The calibration techniques can be easily performed and the alignment result can be stored in the memory of the mobile device. Thus, a mobile device can be aligned (calibrated) once and the alignment result can be used in the subsequent measurements.

Figure 1A:
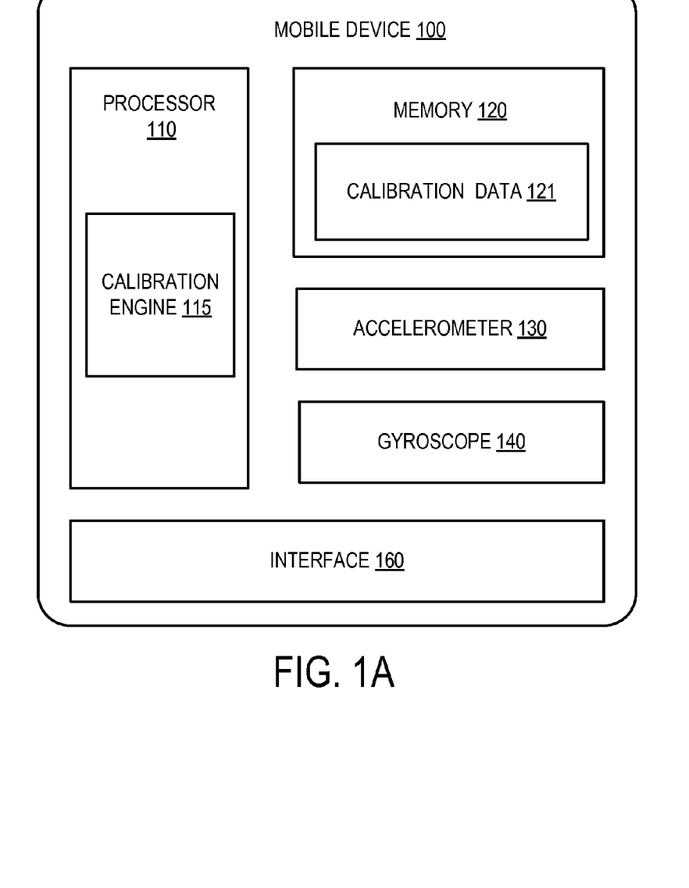
FIG. 1A is a block diagram of a mobile device in which aspects of the invention may be practiced.

FIG. 1A is block diagram illustrating a system in which embodiments of the invention may be practiced. The system may be a mobile device 100, which may include a processor 110, a memory 120, an interface 160 and one or more sensors such as an accelerometer 130 and a gyroscope 140. In one embodiment, the mobile device 100 may include both the accelerometer 130 and the gyroscope 140; in an alternative embodiment, the mobile device 100 may include either the accelerometer 130 or the gyroscope 140. It should be appreciated that the mobile device 100 may also include a display device, a user interface (e.g., keyboard, touchscreen, etc.), a power device (e.g., a battery), as well as other components typically associated with a mobile communication device. For example, the interface 160 may be a wireless transceiver to transmit and receive wireless signals through a wireless link to/from a wireless network, or may be a wired interface for direct connection to networks (e.g., the Internet). Thus, the mobile device 100 may be a: cell phone, smart phone, personal digital assistant, mobile computer, tablet, personal computer, laptop computer, e-reader, or any type of mobile device that has motion sensing and/or rotation sensing capabilities.

In one embodiment, the processor 110 may include a calibration engine 115, which may be implemented in hardware, firmware, software, or a combination of any of the above. In one embodiment, the processor 110 may be a general-purpose processor or a special-purpose processor configured to execute instructions for performing the operations of calibration engine 115 that aligns the coordinate system of the sensor (e.g., the accelerometer 130 and/or the gyroscope 140) with the surface of the mobile device 100.

The memory 120 may be coupled to the processor 110 to store instructions for execution by the processor 110. The memory 120 may also store calibration data 121, which includes the alignment results generated by the calibration described herein.

It should be appreciated that embodiments of the invention as will be hereinafter described may be implemented in conjunction with the execution of instructions by the processor 110 of the mobile device 100 and/or other circuitry of the mobile device 100 and/or other devices. Particularly, circuitry of the mobile device 100, including but not limited to the processor 110, may operate under the control of a program, routine, or the execution of instructions to execute methods or processes in accordance with embodiments of the invention. For example, such a program may be implemented in firmware or software (e.g. stored in the memory 120 and/or other locations) and may be implemented by processors, such as the processor 110, and/or other circuitry of the mobile device 100. Further, it should be appreciated that the terms processor, microprocessor, circuitry, controller, etc., refer to any type of logic or circuitry capable of executing logic, commands, instructions, software, firmware, functionality and the like.

Figure 1B:
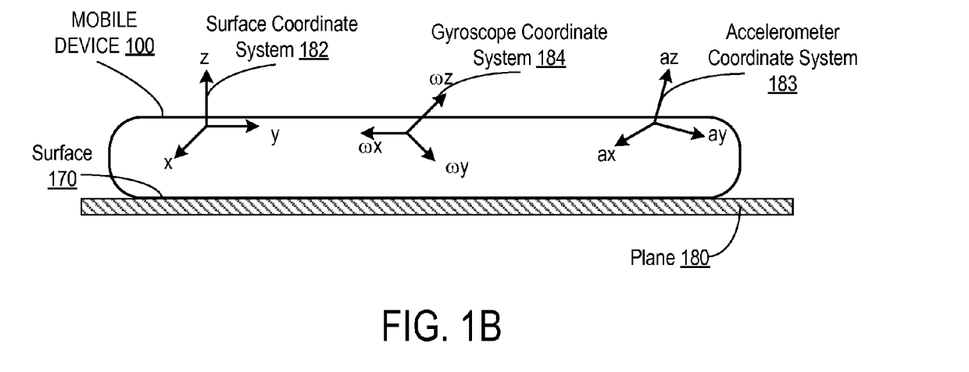
FIG. 1B is a side profile of the mobile device of FIG. 1A.

FIG. 1B illustrates a side profile of the mobile device 100 according to one embodiment. The mobile device 100 has a front surface and a back surface (one facing up and the other facing down in the example of FIG. 1B). The "surface" of the mobile device 100 to which the sensor coordinate system (i.e., the accelerometer coordinate system 183 and/or the gyroscope coordinate system 184) is to be aligned is a surface 170 that faces and is in contact with a plane 180 (e.g., a table top). If the front surface and the back surface of the mobile device 100 are parallel to each other, aligning the back surface of the mobile device 100 is the same as aligning its front surface. The surface 170 defines a surface coordinate system 182 (also referred to as a "device coordinate system"), in which the surface 170 lies on the x-y plane (with the assumption that the surface 170 is planar) and the normal of the surface is parallel to the z axis of the surface coordinate system 182. The accelerometer coordinate system 183 is the coordinate system in which all of the accelerometer measurements lie. Likewise, the gyroscope coordinate system 184 is the coordinate system in which all of the gyroscope measurements lie.

The sensor coordinate systems 183, 184 are not necessarily aligned with the surface coordinate system 182. The accelerometer coordinate system 183 and the surface coordinate system 182 are misaligned when the x-y plane of the surface coordinate system 182 is not aligned with the ax-ay plane of the accelerometer coordinate system 183. Likewise, the gyroscope coordinate system 184 and the surface coordinate system 182 are misaligned when the x-y plane of the surface coordinate system 182 is not aligned with the cox-cry plane of the gyroscope coordinate system 184. That is, the misalignment described herein is the rotational misalignment. As will be described in detail below, embodiments of the invention provide calibration techniques to align each of the sensor coordinate systems 183, 184 with the surface coordinate system 182. In the following description, alignment with the surface coordinate system 182 is also referred to as alignment with the surface of the mobile device 100.

Figure 2A:
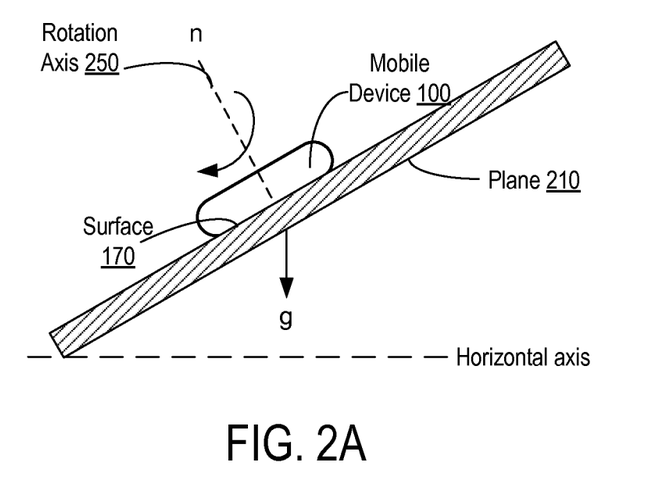
FIG. 2A and FIG. 2B illustrate examples of calibrating a mobile device as viewed from the side of the mobile device according to some embodiments.

In an embodiment where the mobile device 100 includes the accelerometer 130, the accelerometer 130 may be calibrated as follows. FIG. 2A illustrates an example in which the mobile device 100 lies on a tilted plane 210 as viewed from the side of the mobile device 100. The plane 210 is tilted with respect to the horizontal axis. The plane 210 has a planar surface on which the mobile device 100 lies. When the accelerometer 130 is stationary, the acceleration vector that it measures is the gravity vector g. The gravity vector g, which equals 9.81 m/s² measured at sea level, points straight down to the earth center. The gravity vector g may be represented by [0, 0, 9.81] in a coordinate system having a z axis pointing straight down to the earth center. The gravity vector measured by the accelerometer 130 is g', which has the same vector length (9.81 m/s² measured at sea level) as the gravity vector g, but may be a rotated version of g due to the orientation of the accelerometer 130 and calibration errors. For example, the measured gravity vector g' may be [5, 2.69, 8] in the accelerometer coordinate system 183. If the accelerometer coordinate system 183 and the surface coordinate system 182 are aligned, the gravity vector in the surface coordinate system 182 will be also g'. However, when the accelerometer coordinate system 183 and the surface coordinate system 182 are misaligned, the gravity vector g" in the surface coordinate system 182 is further rotated from g' by an angle in the 3-D Euclidian frame. The alignment results generated by the calibration described herein is a rotational transformation that transforms g' to g".

Figure 2B:
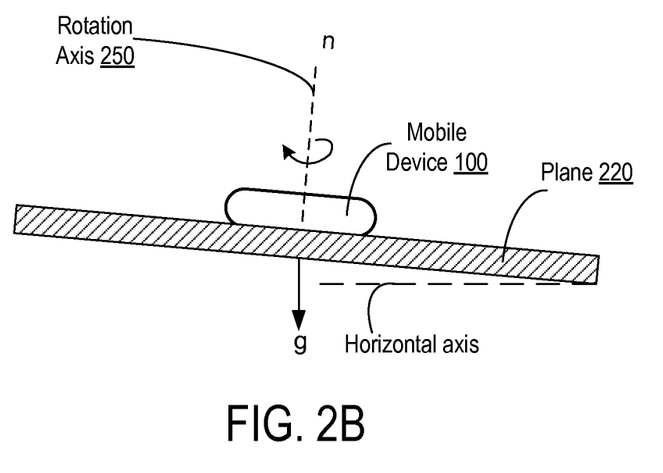

FIG. 2B illustrates another example in which the mobile device 100 lies on a tilted plane 220 as viewed from the side of the mobile device 100. The plane 220 is tilted with respect to the horizontal axis. The plane 220 has a planar surface on which the mobile device 100 lies. FIG. 2B is similar to FIG. 2A except that the plane 220 is tiled at a different angle. In another embodiment, the plane on which the mobile device lies may be horizontal. It is appreciated that the plane on which the mobile device 100 lies may be oriented at any angle (including horizontal) without affecting the correctness and accuracy of the calibration techniques described herein.

To calibrate the misalignment error between the accelerometer coordinate system 183 and the surface coordinate system 182, a user of the mobile device 100 may rotate the mobile device 100 around a rotation axis 250 on the plane 210 in a series of rotate-and-hold motions. That is, the user may hold the mobile device 100 stationary at multiple orientations with respect to the rotation axis 250. The rotation axis 250 is the normal of the plane 210 (also referred to as the "plane normal"). Each "rotate" changes the orientation of the mobile device 100 with respect to the plane normal, while each "hold" allows the accelerometer 130 to take a measurement of the gravity vector g'. As the mobile device surface 170 is parallel to the plane 210, the plane normal is the same as the normal of the surface 170.

Figure 3A:
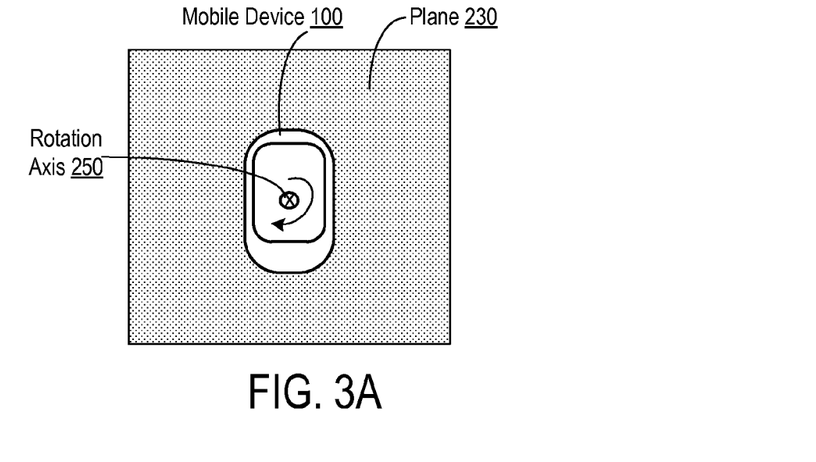
FIG. 3A and FIG. 3B illustrate examples of calibrating a mobile device as viewed from the top of the mobile device according to some embodiments.
Figure 3B:
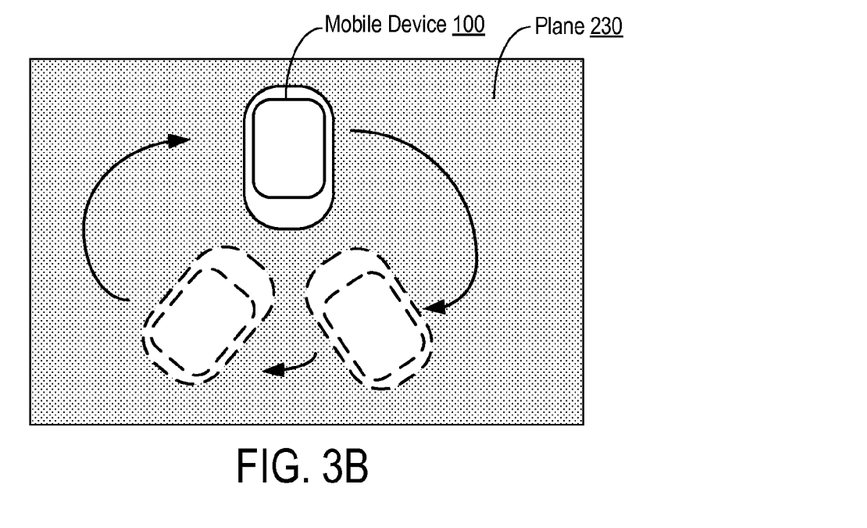

FIG. 3A illustrates yet another example in which the mobile device 100 lies on a plane 230 as viewed from the top of the mobile device 100. The plane 230 can be the plane 210, 220 (of FIGS. 2A and 2B), or any other plane that has a planar top surface. As described above with reference to FIG. 2A and FIG. 2B, the mobile device 100 may be rotated around the rotation axis 250. Alternatively, as shown in FIG. 3B, the mobile device 100 may be rotated and moved along a circular or semi-circular path. That is, in addition to the rotational motion around the rotation axis 250, the mobile device 100 may also be subject to a translational motion on the plane 230. The accuracy of the calibration techniques described herein is not affected by the translational motion on the plane 210. The calibration techniques described herein can produce accurate results as long as the user positions the mobile devices 100 in multiple different orientations on the plane 230.

Figure 4A:
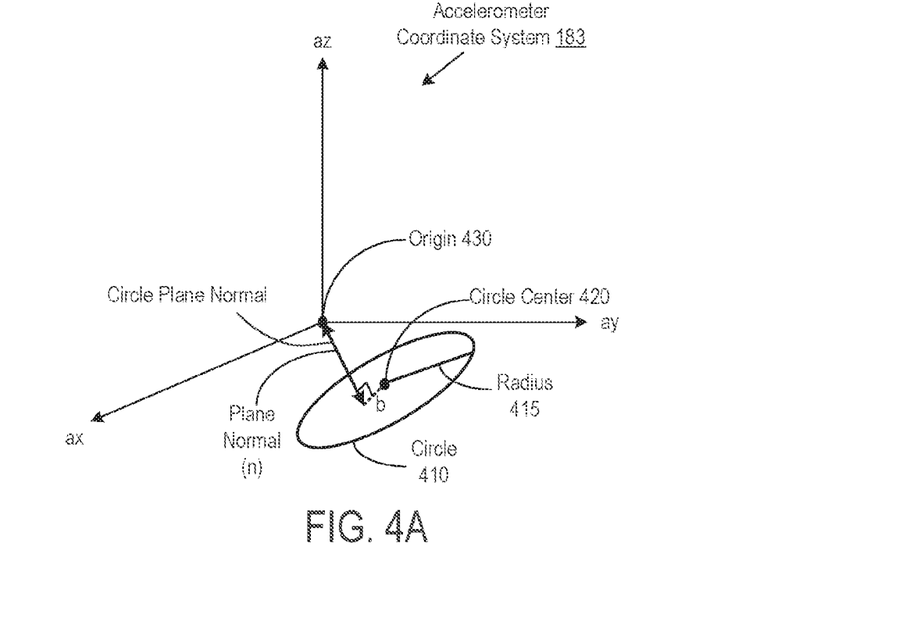
FIG. 4A illustrates calibration measurements in an accelerometer coordinate system according to one embodiment.

FIG. 4A illustrates an embodiment of the accelerometer coordinate system 183 in which measurements of acceleration vectors are taken and collected at different orientations with respect to the plane normal. Each measurement is a measured acceleration vector that extends from the origin 430 of the accelerometer coordinate system 183 to a point in the 3-D space. These points, which are the respective tips of the measured acceleration vectors, transcribe a circle in the accelerometer coordinate system 183. Thus, a circle 410 can be calculated to fit these multiple points. The circle 410 lies on a plane (referred to as the "circle plane") which is parallel to the plane (e.g., the plane 210, 220 or 230) on which the mobile device lies. The radius 415 of the circle 410 is the in-plane component of a representative acceleration vector, where the in-plane component is perpendicular to the plane normal. The representative acceleration vector represents an "average" or "normalized" vector of the measured acceleration vectors. As the length of each measured acceleration vector, as well as the representative acceleration vector, is known (which is equal to 9.81 m/s²), the rotation angle between the representative acceleration vector and the plane normal can be calculated. This rotation angle can be stored in memory of the mobile device 100 and used for calibrating the subsequent accelerometer measurements.

The calibration technique described above is robust in the presence of a bias. A bias exists when there are other sources of errors than the rotational error between the accelerometer coordinate system 183 and the surface coordinate system 182. The bias can be measured by extending the plane normal from the origin 430 of the accelerometer coordinate system 183 to the circle plane, where the plane normal meets the circle plane at an intersecting point. The distance between the intersecting point and the circle center 420 is the bias, b. When there is no bias, the intersecting point coincides with the circle center 420. It is noted that the circle plane, the plane on which the mobile device 100 lies, and the surface 170 of the mobile device 100 are all parallel to each other. Therefore, the plane normal is also the normal of the circle plane.

Figure 4B:
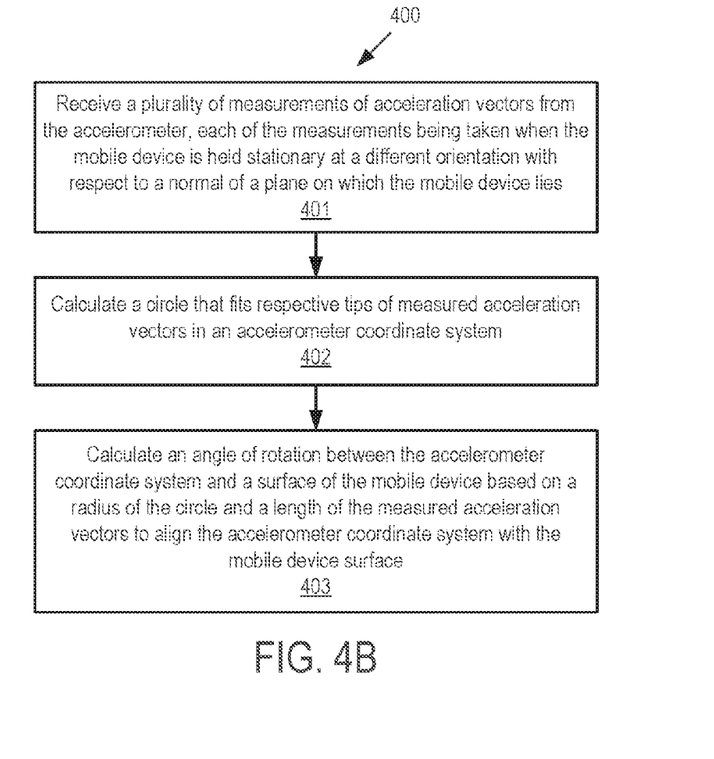
FIG. 4B is a flow diagram illustrating an accelerometer calibration method according to one embodiment.

FIG. 4B illustrates an embodiment of accelerometer calibration method 400 performed by a mobile device, such as the processor 110 of FIG. 1A. In one embodiment, the method 400 may be performed by the calibration engine 115 of FIG. 1A, which can be implemented by hardware, software, firmware, or a combination of any of the above.

In one embodiment, the processor receives multiple measurements of acceleration vectors from the accelerometer (block 401). Each measurement is a measured acceleration vector. Each measurement is taken when the mobile device is held stationary at a different orientation with respect to the normal of a plane on which the mobile device lies. The processor calculates a circle that fits respective tips of the measured acceleration vectors in the accelerometer coordinate system (block 402). Based on the radius of the circle and the length of the measured acceleration vectors, the processor calculates an angle of rotation between the accelerometer coordinate system and the surface of the mobile device (block 403). The angle of rotation can be stored in the memory within the mobile device to calibrate subsequent measurements of the accelerometer and to thereby align the accelerometer coordinate system and the mobile device surface.

In an embodiment where the mobile device 100 includes the gyroscope 140, the gyroscope 140 may be calibrated as follows. Referring again to FIG. 3A, to calibrate the misalignment error between the gyroscope coordinate system 184 and the surface coordinate system 182, a user of the mobile device 100 may rotate the mobile device 100 around the rotation axis 250 (i.e., the plane normal) one or more times on the plane 230 at multiple different rotation rates (i.e., rotation speeds). This plane 230 may be the plane 210 (FIG. 2A), plane 220 (FIG. 2B), a horizontal plane, or any plane that has a planar top surface on which the mobile device 100 lies. Typically, when a user performs one manual rotation of the mobile device 100, the rotation speed is faster at the beginning and slower towards the end of the rotation. Thus, the gyroscope 140 can make multiple measurements from one manual rotation of the mobile device 100.

Alternatively, as shown in FIG. 3B, the mobile device 100 may be rotated and moved along a circular or semi-circular path. That is, in addition to the rotational motion around the rotation axis 250, the mobile device 100 may also be subject to a translational motion on the plane 230. The accuracy of the calibration techniques described herein is not affected by the translational motion on the plane 210. The calibration techniques can produce accurate calibration results as long as the user rotates the mobile devices 100 at multiple different rates on the plane 230.

Figure 5A:
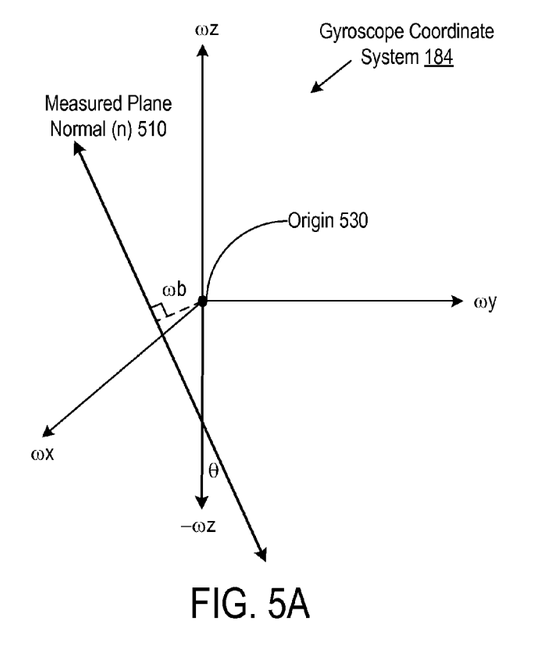
FIG. 5A illustrates calibration measurements in a gyroscope coordinate system according to one embodiment.

FIG. 5A illustrates an embodiment of the gyroscope coordinate system 184, in which measurements of the rotation axis 250 (i.e., the plane normal) are taken and collected at different rotation rates when the mobile device 100 is rotated with respect to the plane normal. Each measurement is a point that lies on the plane normal in the gyroscope coordinate system 184. The angular speed at which the mobile device 100 is rotated is the length of the vector that extends from the origin 530 of the gyroscope coordinate system 184 to the measured point. Each vector may have a different length depending on the rotation rate at which the corresponding measurement is made. The multiple points of the measurements transcribe a line in the gyroscope coordinate system 184. Thus, a line 510 can be calculated to fit these multiple points. The line 510 is a measured plane normal in the gyroscope coordinate system 184. The misalignment error between the gyroscope coordinate system 184 and the surface coordinate system 182 can be obtained by calculating the rotation angle ($\theta$) between the line 510 (i.e., the measured plane normal) and the $\omega z$ axis (e.g., [0, 0, 1]) or $-\omega z$ axis.

The calibration method described above is robust in the presence of a bias. A bias $\omega b$ exists when there are other sources of errors than the rotational error between the gyroscope coordinate system 184 and the surface coordinate system 182. The bias can be measured by the perpendicular distance (shown as a dotted line) between the origin 530 of the gyroscope coordinate system 184 and the line that fits all the gyroscope measurements, which is also the measured plane normal 510. When there is no bias (as in the case of an ideal gyroscope), the line that fits the gyroscope measurements will pass through the origin 530 of the gyroscope coordinate system 184; in other words, the measurements will read zero angular velocity when the gyroscope is perfectly stationary. The bias $\omega b$ is the additive offset error in the gyroscope measurements of angular velocity. In other words, the bias $\omega b$ is the mean value of the gyroscope measurements when the gyroscope is perfectly stationary.

Figure 5B:
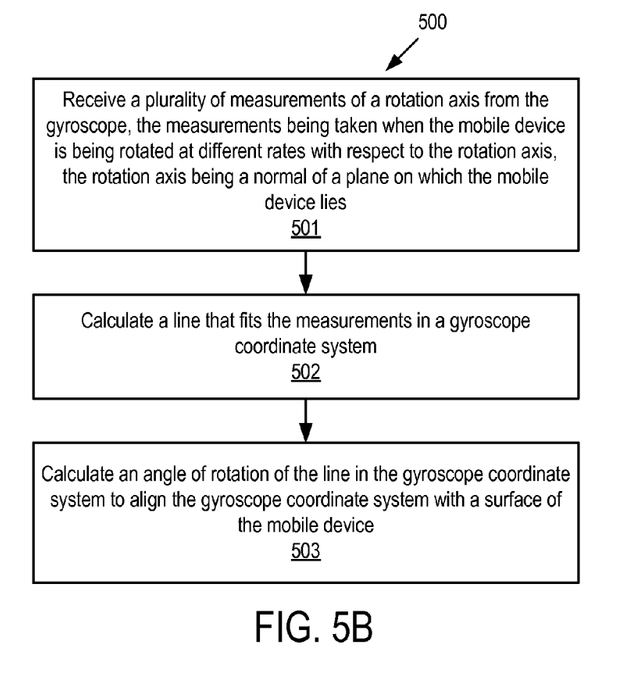
FIG. 5B is a flow diagram illustrating a gyroscope calibration method according to one embodiment.

FIG. 5B illustrates an embodiment of gyroscope calibration method 500 performed by a mobile device, such as the processor 110 of FIG. 1A. In one embodiment, the method 500 may be performed by the calibration engine 115 of FIG. 1A, which can be implemented by hardware, software, firmware, or a combination of any of the above.

In one embodiment, the processor receives multiple measurements of a rotation axis from the gyroscope (block 501). The measurements are taken when the mobile device is being rotated at different rates with respect to the rotation axis, where the rotation axis is the normal of a plane on which the mobile device lies (block 501). Each measurement is a point representing the measured plane normal in the gyroscope coordinate system. The processor calculates a line that fits the measurements in the gyroscope coordinate system (block 502). The processor calculates a rotation angle between the line and an axis (e.g., the $\omega z$ axis) of the gyroscope coordinate system to align the gyroscope coordinate system with the surface of the mobile device (block 503). The rotation angle can be stored in the memory within the mobile device to calibrate subsequent measurements of the gyroscope.

In an embodiment of a mobile device that has both an accelerometer and a gyroscope, the calibration techniques described above allows the alignment of the accelerometer coordinate system with respect to the gyroscope coordinate system to be computed and vice versa. Any ambiguity with respect to the rotation along the normal vector n (of the mobile device surface) can be removed by prior knowledge of the placement of the sensors within the mobile device. For example, if both sensors are placed in the same semiconductor chip within the mobile device and their axes are aligned, both sensors' rotations along the normal vector are zero. If one sensor is placed perpendicularly to another sensor in the plane of the same chip and their axes are orthogonal, the sensors' rotations along the normal vector are 90 degrees apart. With this knowledge about the sensors' placement, each sensor may be calibrated separately against the mobile device surface in accordance with the methods of FIG. 4B and FIG. 5B. The measurement in the accelerometer coordinate system can then be converted into the gyroscope coordinate system, and vice versa, via their respective calibrations against the mobile device surface. By using the stored calibration data with respect to the accelerometer and the gyroscope in the mobile device, the mobile device can use measurements from both these sensors and convert them to a common coordinate system before using them in an application.

For example, a measurement in the accelerometer coordinate system can be converted to the gyroscope coordinate system as follows, assuming that any ambiguity with respect to the rotation along the normal vector has been removed. First, a measured acceleration vector is rotated by the angle of rotation obtained using the method 400 (FIG. 4B) to transform the measured acceleration vector from the accelerometer coordinate system to a vector in the surface coordinate system. Subsequently, the vector in the surface coordinate system can be converted to a gyroscope coordinate system based on a rotational transformation between the surface coordinate system and the gyroscope coordinate system, where the rotational transformation is representative of the angle θ obtained using the method 500 (FIG. 5B). Similarly, a measurement in the gyroscope coordinate system can be converted to the accelerometer coordinate system as follows. First, the angle θ obtained using the method 500 (FIG. 5B) can be applied to a measurement of the gyroscope to align that measurement to the surface coordinate system. Subsequently, the aligned measurement in the surface coordinate system can be converted to an accelerometer coordinate system based on a rotational transformation between the surface coordinate system and the accelerometer coordinate system, where the rotational transformation is representative of the angle of rotation obtained using the method 400 (FIG. 4B).

It should be appreciated that when the mobile device is a wireless mobile device, it may communicate via one or more wireless communication links through a wireless network that are based on or otherwise support any suitable wireless communication technology. For example, in some aspects computing device or server may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

The techniques described herein can be used for various wireless communication systems such as Code Division Multiple Access (CDMA), Time division multiple access (TDMA), Frequency Division Multiple Access (FDMA), Orthogonal Frequency-Division Multiple Access (OFDMA), Single Carrier FDMA (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers Interim Standard (IS)-2000, IS-95 and IS-856 standards. A TDMA system can implement a radio technology such as Global System for Mobile Communications (GSM). An OFDMA system can implement a radio technology such as Evolved Universal Terrestrial Radio Access; (Evolved UTRA or E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDM®, etc. Universal Terrestrial Radio Access (UTRA) and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

The techniques described herein may be incorporated into (e.g., implemented within or performed by) a variety of mobile apparatuses (e.g., devices). For example, one or more aspects taught herein may be incorporated into a phone (e.g., a cellular phone), a personal data assistant ("PDA"), a tablet, a mobile computer, a laptop computer, a tablet, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a point-of-sale device, an entertainment device, or any other suitable device. These devices may have different power and data requirements Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for calibrating an accelerometer located within a mobile device, comprising:
   receiving a plurality of measurements of acceleration vectors by a processor of the mobile device from the accelerometer, each of the measurements being taken when the mobile device is held stationary at a different orientation with respect to a normal of a plane on which the mobile device lies;
   calculating a circle that fits respective tips of the measured acceleration vectors in an accelerometer coordinate system;
   calculating an angle of rotation between the accelerometer coordinate system and a surface of the mobile device based on a radius of the circle and a length of the measured acceleration vectors to align the accelerometer coordinate system with the surface of the mobile device, wherein the angle of rotation is calculated in the presence of a bias, wherein the bias is measured by a distance between a center of the circle and an intersection point, at which the normal extending from an origin of the accelerometer coordinate system intersects a second plane containing the circle;
   storing the angle of rotation in a memory of the mobile device; and
   calibrating subsequent measurements of the accelerometer based at least in part on the stored angle of rotation in the memory; wherein the surface of the mobile device against which the accelerometer coordinate system is calibrated is the surface that faces and is in contact with the plane.

2. The method of claim 1, wherein the plane is tilted with respect to a horizontal axis.

3. The method of claim 1, wherein the plane is aligned to a horizontal axis.

4. The method of claim 1, wherein each of the measurements is taken when the mobile device is held stationary after being rotated by an angle with respect to the normal of the plane.

5. The method of claim 1, further comprising:
   rotating a measured acceleration vector by the angle of rotation to transform the measured acceleration vector from the accelerometer coordinate system to a vector in a surface coordinate system defined by the surface of the mobile device; and
   converting the vector in the surface coordinate system to a gyroscope coordinate system based on a rotational transformation between the surface coordinate system and the gyroscope coordinate system.

6. A mobile device comprising:
   an accelerometer;
   a processor coupled to the accelerometer and a memory, the processor configured to:

receive a plurality of measurements of acceleration from the accelerometer, each of the measurements being taken when the mobile device is held stationary at a different orientation with respect to a normal of a plane on which the mobile device lies;

calculate a circle that fits respective tips of measured acceleration vectors in an accelerometer coordinate system;

calculate an angle of rotation between the accelerometer coordinate system and a surface of the mobile device based on a radius of the circle and a length of the measured acceleration vectors to align the accelerometer coordinate system with the surface of the mobile device, wherein the angle of rotation is calculated in the presence of a bias, wherein the bias is measured by a distance between a center of the circle and an intersection point, at which the normal extending from an origin of the accelerometer coordinate system intersects a second plane containing the circle; and store the angle of rotation in the memory; and calibrate subsequent measurements of the accelerometer based at least in part on the stored angle of rotation in the memory; wherein the surface of the mobile device against which the accelerometer coordinate system is calibrated is the surface that faces and is in contact with the plane.

7. The mobile device of claim 6, wherein each of the measurements is taken when the mobile device is held stationary after being rotated by an angle with respect to the normal of the plane.

8. The mobile device of claim 6, further comprising:

a gyroscope coupled to the processor;

wherein the processor is further configured to:

rotate a measured acceleration vector by the angle of rotation to transform the measured acceleration vector from the accelerometer coordinate system to a vector in a surface coordinate system defined by the surface of the mobile device; and convert the vector in the surface coordinate system to a gyroscope coordinate system based on a rotational transformation between the surface coordinate system and the gyroscope coordinate system.

9. A non-transitory computer program product implemented at a mobile device for calibrating an accelerometer located within the mobile device, comprising:

a computer-readable medium comprising code for:

receiving a plurality of measurements of acceleration vectors by a processor of the mobile device from the accelerometer, each of the measurements being taken when the mobile device is held stationary at a different orientation with respect to a normal of a plane on which the mobile device lies;

calculating a circle that fits respective tips of measured acceleration vectors in an accelerometer coordinate system;

calculating an angle of rotation between the accelerometer coordinate system and a surface of the mobile device based on a radius of the circle and a length of the measured acceleration vectors to align the accelerometer coordinate system with the surface of the mobile device, wherein the angle of rotation is calculated in the presence of a bias, wherein the bias is measured by a distance between a center of the circle and an intersection point, at which the normal extending from an origin of the accelerometer coordinate system inter-sects a second plane containing the circle;

storing the angle of rotation in a memory of the mobile device; and calibrating subsequent measurements of the accelerometer based at least in part on the stored angle of rotation in the memory; wherein the surface of the mobile device against which the accelerometer coordinate system is calibrated is the surface that faces and is in contact with the plane.

10. The non-transitory computer program product of claim 9, wherein each of the measurements is taken when the mobile device is held stationary after being rotated by an angle with respect to the normal of the plane.

11. The non-transitory computer program product of claim 9, further comprising code for:

rotating a measured acceleration vector by the angle of rotation to transform the measured acceleration vector from the accelerometer coordinate system to a vector in a surface coordinate system defined by the surface of the mobile device; and converting the vector in the surface coordinate system to a gyroscope coordinate system based on a rotational transformation between the surface coordinate system and the gyroscope coordinate system.

12. A mobile device comprising:

means for receiving a plurality of measurements of acceleration from an accelerometer, each of the measurements being taken when the mobile device is held stationary at a different orientation with respect to a normal of a plane on which the mobile device lies;

means for calculating a circle that fits respective tips of measured acceleration vectors in an accelerometer coordinate system;

means for calculating an angle of rotation between the accelerometer coordinate system and a surface of the mobile device based on a radius of the circle and a length of the measured acceleration vectors to align the accelerometer coordinate system with the surface of the mobile device, wherein the angle of rotation is calculated in the presence of a bias, wherein the bias is measured by a distance between a center of the circle and an intersection point, at which the normal extending from an origin of the accelerometer coordinate system intersects a second plane containing the circle;

means for storing the angle of rotation in a memory of the mobile device; and means for calibrating subsequent measurements of the accelerometer based at least in part on the stored angle of rotation in the memory; wherein the surface of the mobile device against which the accelerometer coordinate system is calibrated is the surface that faces and is in contact with the plane.

13. The mobile device of claim 12, wherein each of the measurements is taken when the mobile device is held stationary after being rotated by an angle with respect to the normal of the plane.

14. The mobile device of claim 12, wherein means for calculating the angle of rotation further comprises means for calculating the angle of rotation in the presence of a bias, wherein the bias is measured by a distance between a center of the circle and an intersection point, at which the normal extending from an origin of the accelerometer coordinate system intersects a second plane containing the circle.

15. The mobile device of claim 12, further comprising:

means for rotating a measured acceleration vector by the angle of rotation to transform the measured acceleration vector from the accelerometer coordinate system to a vector in a surface coordinate system defined by the surface of the mobile device; and means for converting the vector in the surface coordinate system to a gyroscope coordinate system based on a rotational transformation between the surface coordinate system and the gyroscope coordinate system.

* * * * *